J. W. GALLESPIE.
SCRAPER.
APPLICATION FILED SEPT. 27, 1912.
1,124,006.
Patented Jan. 5, 1915.
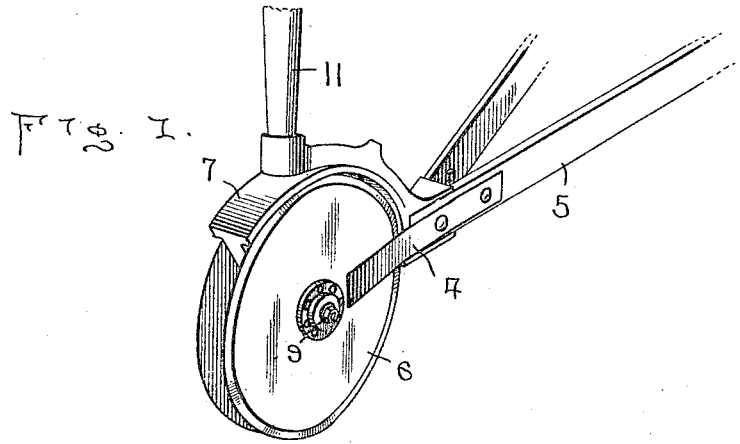
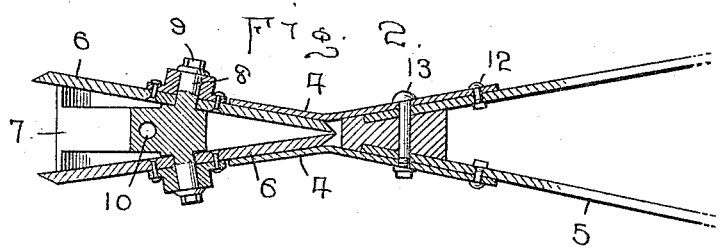
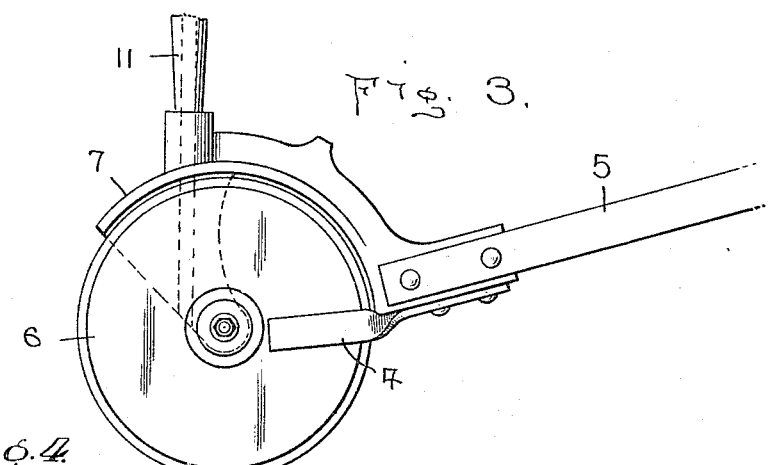
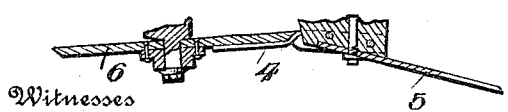
Witnesses
Thos. W. Piery
M. Newcomb
Inventor
J. W. Gallespie
By W. P. Fitz Gerald & Co.
Attorney

UNITED STATES PATENT OFFICE.

JOHN W. GALLESPIE, OF DENBIGH, NORTH DAKOTA.

SCRAPER.

1,124,006.  Specification of Letters Patent.  Patented Jan. 5, 1915.

Application filed September 27, 1912. Serial No. 722,664.

*To all whom it may concern:*

Be it known that I, JOHN W. GALLESPIE, a citizen of the United States, residing at Denbigh, in the county of McHenry and State of North Dakota, have invented certain new and useful Improvements in Scrapers; and I do hereby declare the following to be a full, clear, and exact description of the invention, such as will enable others skilled in the art to which it appertains to make and use the same.

My invention relates to new and useful improvements in scrapers for disks and particularly to scraping devices adapted to be employed with double disk plows.

The prime object of my invention is to provide a scraping device which will effectually clean the cutting faces of a double disk plow and which are so arranged as to maintain the edges in normal position in use.

Other objects and advantages will be hereinafter made clearly apparent in the specifications and claim.

In the accompanying drawings I have shown the preferred form which my invention may take.

In said drawings, Figure 1 is a perspective view of my invention as applied to use. Fig. 2 is a horizontal sectional view therethrough. Fig. 3 is a side elevation showing a slightly modified form of scraping blade. Fig. 4 is a sectional view on the line 4—4 of Fig. 3.

Referring to the drawings by numerals of reference, the same numeral designating corresponding parts throughout the several views, I employ scraping blades 4, which are secured to the sides of the draft beams 5 of a disk plow so that the scraping blades will bear against the cutting disks 6 from a point near their center to their outer edge. As shown in the drawings the scraping blades are arranged substantially horizontally and scrape the cutting disks at the forward portions of the disk and just above the surface of the ground.

The disks employed by me are arranged obliquely and in a frame 7, which is connected at its forward end to the draft bars 5. The frame 7 is provided with a pair of obliquely disposed axles 8, which are received by the hubs of the disks 6, and secured in place by means of nuts 9. The axles are arranged so that the disks will meet at their forward edges, as clearly shown in Fig. 2. The frame 7 is provided with a bore 10 arranged substantially vertically therethrough and a dropping tube 11 is connected to the upper end of the bore so that seed, grain, fertilizer, etc., may be fed through the tube and dropped in the furrow formed when the disks are drawn over the ground.

As shown in the drawings the scraping blades 4 are secured by bolts 12 to the draft bars 5 and by a single bolt 13 to the rear ends of the draft bars and the forward end of the frame 7, the draft bars being countersunk in the frame.

In the usual construction of double disk plows it is customary to employ a scraper which is disposed to bear against the upper rear portion of the disk and said scrapers have a tendency to separate the forward edges of the disk and to cause the axles to wear in an uneven manner. By arranging the scraping blades in the manner shown in the drawing this tendency will be overcome and the forward cutting edges of the disks will be held tightly together, thus reducing the draft of the plow and cutting a clean furrow.

In Fig. 3, the scraping portions of the blades are arranged in the same relative positions as the blades shown in Fig. 1, but the anchoring portion of the blades are given a half turn so that the same may be secured to the under surface of the draft bars and frame. The turn or twist in this blade is formed at the periphery of the disk 6 and consequently that portion of the blade nearly conforms to the edge of the disk thus assisting in cleaning that portion of the latter.

Having thus fully set forth the features of my invention, further description is deemed unnecessary.

What I claim as new is:

In combination, a pair of disks having beveled circumferential cutting edges inclined forwardly toward one another, a frame for supporting the disks, draft bars extending forwardly from said frame, a scraping blade for each disk secured to the under side of said frame and extending rearwardly of said disk, the portions of said blades intermediate the draft bars and front edges of the disks being twisted, whereby the rear portions lie flat upon the side faces of said disks, and the front portions lie flat upon the under side of said
5 frame, and the intermediate twisting portions substantially conform to the bevel cutting edges of the disks.

In testimony whereof I have signed my name to this specification in the presence of two subscribing witnesses.

JOHN W. GALLESPIE.

Witnesses:
D. J. O'CONNELL,
E. A. LOHRKE.